Figure 1:
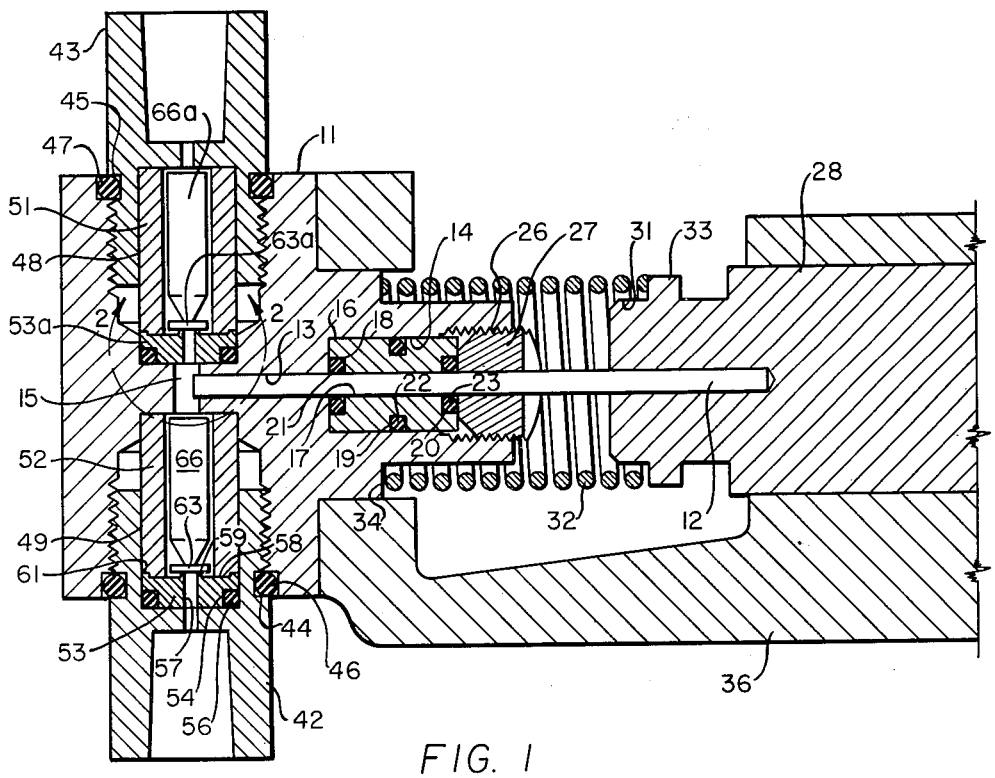

March 24, 1964 E. M. WHITLEY ETAL 3,125,963
FLUID FEED PUMP
Filed Oct. 31, 1960

ERNEST M. WHITLEY
FLORINDO VITI
INVENTORS

BY Flehr and Swain
ATTORNEY

United States Patent Office 3,125,963
Patented Mar. 24, 1964

3,125,963
FLUID FEED PUMP
Ernest M. Whitley and Florindo Viti, Palo Alto, Calif., assignors to Beckman Instruments, Inc., a corporation of California
Filed Oct. 31, 1960, Ser. No. 66,085
2 Claims. (Cl. 103—153)

This invention relates to a fluid feed pump.

In certain chemical processes, accurate volumes of fluids are continuously transferred at relatively slow rates and often at high pressures. One type of prior art fluid feed pump has included a pump chamber into which a reciprocating piston projects. Ball type valves are disposed in the inlet and outlet passageways to the pump chamber for controlling the flow of liquid. Valves of this type are difficult to form accurately, and thus do not afford a competent seal. Furthermore, when a relatively viscous fluid is pumped, a film may remain between the ball and seat preventing the ball from properly seating, or it will retard the seating. The consequence of the foregoing is that there may be a flow of fluid back into the supply lines when fluid is being pumped out of the chamber, or there may be a flow of delivered fluid back into the pump chamber as fluid is drawn into the chamber from the supply line.

Various arrangements employing seating members and seats of different configurations have been employed to overcome the foregoing. Additionally, to affect a complete seal, certain seating members have been loaded.

It is a general object of the present invention to provide an improved fluid feed pump.

It is another object of the present invention to provide a fluid feed pump having an improved valve assembly.

It is a further object of the present invention to provide a fluid feed pump having a valve assembly which includes an annular seat and a loaded seating disc.

It is another object of the present invention to provide a fluid feed pump capable of accurately delivering liquids at relatively slow rates.

It is another object of the present invention to provide a valve assembly which is simple in construction and easy to manufacture within close tolerances.

These and other objects of the invention will become more clearly apparent from the following description taken in conjunction with the accompanying drawing.

Figure 2:
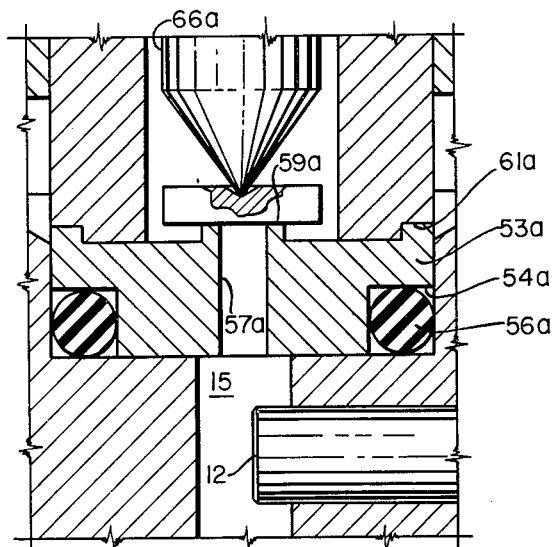

Referring to the drawing:

FIGURE 1 is a side elevational view of a fluid feed pump in accordance with the invention; and FIGURE 2 is an enlarged view of the valve assembly taken along the line 2—2 of FIGURE 1.

The pump includes a body 11 which receives and guides a reciprocating piston 12 which extends into the chamber 15. The body is bored at 13 to slidably receive the piston and includes an enlarged bore portion 14 adapted to receive a sealing plug 16. The sealing plug 16 is also bored at 17 to receive the piston. Annular grooves 18, 19 and 20 are formed in the plug and are adapted to receive O-rings 21, 22 and 23, respectively. The body is threaded at 26 to receive the threaded member 27 which urges the sealing plug 16 inwardly to provide pressure on the O-rings 21 and 23. The diameter of the O-ring 22 is selected whereby it is placed under compression as the plug 16 is placed in the bore 14.

A driving member 28 engages the other end of the piston 12 and is connected to means for reciprocating the same. The reciprocating means may be any of the well-known types and is not illustrated. The member 28 includes a forward cylindrical portion 31 adapted to receive a spring 32 and a shoulder 33. The other end of the spring abuts the shoulder 34 formed in the body 11.

A guide 36 is provided for guiding the member 28 and for mounting the reciprocating means (not shown), if desired. The member 36 is suitably mounted on the body 11.

The body 11 is threaded to receive inlet and outlet fittings 42 and 43, respectively. Annular recesses 44 and 45 are formed in the fittings 42 and 43, respectively. O-rings 46 and 47, respectively, are accommodated in these annular recesses. They seal the assembly when the inlet and outlet couplings 42 and 43 are threaded into the body. The fittings 42 and 43 are bored at 48 and 49 to receive the cylindrical guides 51 and 52, respectively.

The coupling 42 receives the seat member 53. The seat member 53 includes an annular recess 54 adapted to receive an O-ring 56 which acts to provide a seal which prevents flow of liquid past the same. The seat member 53 includes an axial passageway 57 for communicating with the lines connected to the fitting.

The upper surface of the seat member includes an annular groove 58. Adjacent the inner portion of the groove there is formed a rim or seat 59, while adjacent the outer portion of the groove there is formed a support rim 61.

Referring particularly to FIGURE 2, there is shown the seat member 53a of the outlet valve assembly. The valve assemblies are substantially identical, and thus the outlet valve assembly only is described in detail. It is noted that the outer rim 61a is coplanar with the upper surface of the seat 59a. During manufacture, the seat 59a can be accurately lapped since the outer rim forms a support to assure that the seat has a planar upper surface. If the outer rim were not present, there might be a tendency to form a curved surface rather than a planar surface.

The width of the upper surface of the seat (rim) 59a is relatively small so that there is a small contacting surface between the rim 59a and the disc 63a.

A disc 63a is adapted to ride on the rim 59. The abutting surface of the disc is lapped so that it will co-act with the lapped upper surface of the seat. The upper surface of the disc 63a may include (the dimple is not a necessity, but may assist the centralizing) a conical dimple adapted to receive the projecting end of the loading member 66a.

It is noted that the construction of the upper valve assembly is identical to that of the lower valve assembly with the exception that the seat member is received by the body portion 11 rather than by the inlet coupling.

It is to be emphasized that the valve seat and disc formed in accordance with the invention can be accurately lapped. For example, the seat member includes the support rim which will guide the member during lapping to assure that the upper surface of the seat is planar. Likewise, the disc may be accurately lapped. Preferably, the finish on the planar cooperating parts is between two and four micro inches whereby adhesion of the parts due to molecular attraction is prevented.

Because of the accuracy with which the mating sealing parts can be formed, leakage is virtually eliminated. The parts for the inlet and outlet are interchangeable.

We claim:

1. In a fluid pump having a body, a pumping chamber in the body, a piston projecting into said chamber and operable for reciprocating movement in said chamber, a threaded fluid passage formed in said body and communicating with said chamber, said passage including a shoulder in a plane transversely of said passage, a valve assembly comprising a fluid coupling member in said passage and having a cylindrically formed interior open at one end, said coupling member having a transversely extending abutment portion in said interior disposed a predetermined axial distance remote from said open end, a seat member having an opening therethrough to communicate with said passage, said seat member including spaced, concentric inner and outer raised rims, one surface of both said rims lying in a plane common to each, said outer rim forming a support surface and said inner rim forming a seat surface, a cylindrical guide member received by said coupling member and having a predetermined axial extent greater than said predetermined axial distance, said guide member being disposed coaxially of said seat member and arranged to bear upon said seat member, said guide member and said seat member being interposed between said shoulder and said abutment, threads formed in said coupling member to engage said threaded passage to force said guide member against the outer rim of said seat member, and a disk having a planar surface adapted to rest on said inner rim to selectively seal said opening, said disk being loaded against said inner rim.

2. In a fluid pump having a body, a pumping chamber in the body, a piston projecting into said chamber and operable for reciprocating movement in said chamber, threaded inlet and outlet passages formed in said body and communicating with said chamber, said passages including a shoulder in a plane transversely of said passages, a fluid coupling member in each passage, each coupling member having a cylindrically formed interior open at one end, said coupling members having a transversely extending abutment in said interior disposed a predetermined axial distance remote from said open end, a valve assembly in each said coupling member comprising a seat member having an opening therethrough to communicate with one of said passages, said seat member including spaced, concentric inner and outer raised rims, one surface of both said rims lying in a plane common to each, said outer rim forming a support surface and said inner rim forming a seat surface, a cylindrical guide member having a predetermined axial extent greater than said predetermined axial distance, said guide member being disposed coaxially of said seat member and arranged to bear upon said seat member, said guide member and said seat member being interposed between said shoulder and said abutment, threads formed in said coupling member to engage one of said threaded passages to force said guide member against the outer rim of said seat member, and a disk having a planar surface adapted to rest on said inner rim to selectively seal said opening, said disk being loaded against said inner rim.

References Cited in the file of this patent

UNITED STATES PATENTS

| | | |
|---|---|---|
| 455,913 | Walker | July 14, 1891 |
| 1,140,630 | Sutton | May 25, 1915 |
| 2,325,672 | Groff | Aug. 3, 1943 |
| 2,559,659 | Redman | July 10, 1951 |
| 2,766,701 | Giraudeau | Oct. 16, 1956 |
| 2,771,845 | Eagan | Nov. 27, 1956 |
| 2,795,191 | Seter | June 11, 1957 |

FOREIGN PATENTS

| | | |
|---|---|---|
| 5,220 | Great Britain | 1882 |